Jan. 24, 1956
H. A. HARTWIG
2,731,735
MOTOR DRIER
Filed Sept. 8, 1953
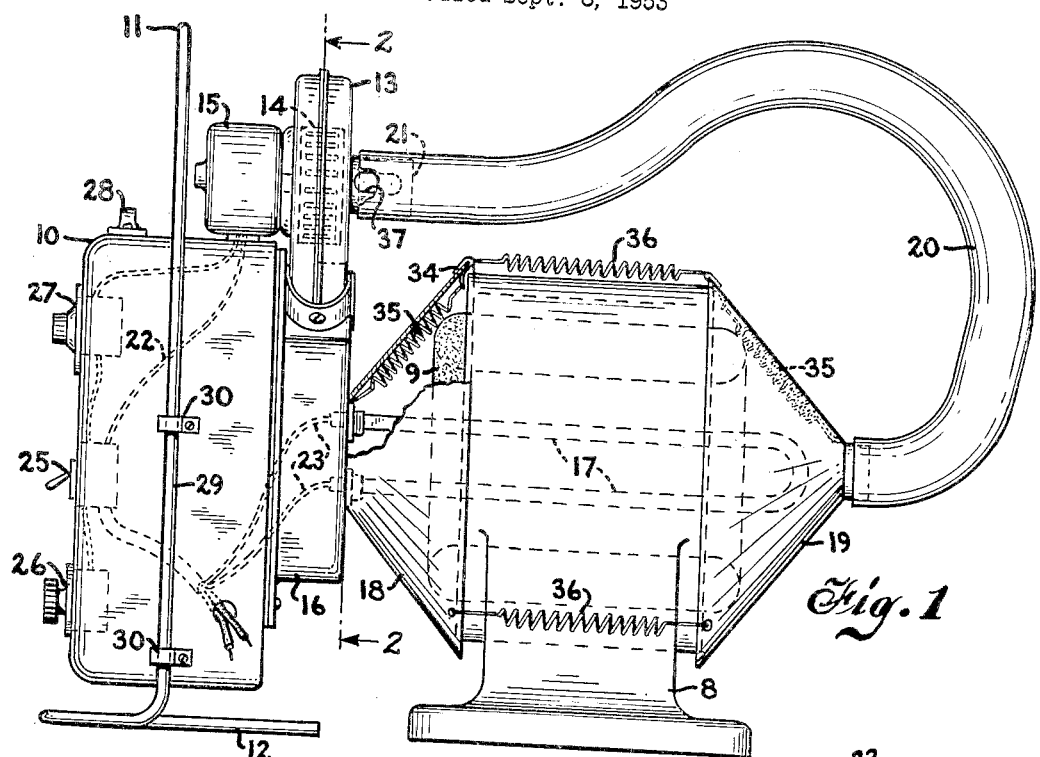
Fig. 1
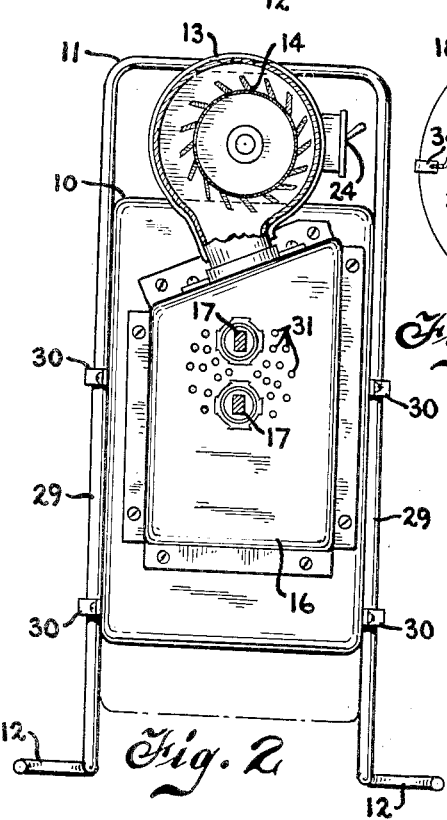
Fig. 2
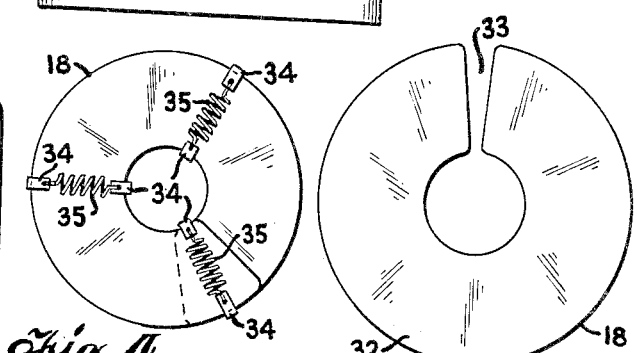
Fig. 4
Fig. 3
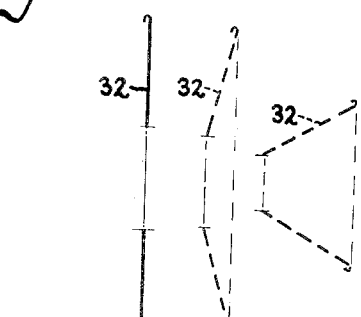
Fig. 5
INVENTOR.
BY H. A. Hartwig
Lieber & Lieber
ATTORNEYS United States Patent Office 2,731,735
Patented Jan. 24, 1956

2,731,735
MOTOR DRIER
Harry A. Hartwig, Wausau, Wis.
Application September 8, 1953, Serial No. 378,913
11 Claims. (Cl. 34—104)

The present invention relates generally to improvements in the art of drying wet or moist articles, and relates more particularly to improvements in the construction and operation of motor driers.

A primary object of my present invention is to provide an improved drier for moist electric motor stators which is exceedingly compact and durable in construction and which is moreover highly efficient and practical in operation and low in cost.

In the manufacture of electric motors, it is, of course, common practice to varnish or otherwise impregnate the motor frame and particularly the stator element prior to assembly of the motor; and likewise, existing motors are frequently dismantled for repair and are accordingly revarnished prior to reassembly. In drying these freshly coated frames prior to assembly or reassembly of the motor, it is presently customary practice to place the frames within a drying oven for a sufficient length of time to permit baking or drying of the coating. However, there are numerous objections and disadvantages attendant such usual procedure. First, due to the inability to concentrate the heat at desired localities within these ovens and especially within and through the opening of the motor stator, the baking time is objectionably long and the wet coating is oftentimes improperly or ineffectively dried. Secondly, the usual baking ovens are undesirably large, bulky and expensive, and since they are definitely not portable, they must be used in a given locality and the motor frames must be handled for placement therein and removal therefrom. Furthermore, due to the varying sizes of motors and other conditions, these ordinary baking ovens cannot be satisfactorily automatically controlled to predetermined heating intervals dependent on the size or condition of the frames being baked.

It is therefore a more particular object of this invention to provide an improved portable drying unit for motor frames which obviates all of the disadvantages and objections heretofore attendant prior devices intended for like purposes.

Another specific object of the invention is to provide an improved drier for motor frames in which the heat may be most effectively concentrated and utilized with resultant savings in operating expense.

Another specific object of my invention is to provide an improved unitary motor drier which is highly flexible in its ready adaptation to motor frames of diverse sizes, and which may be readily carried by a single person from one locality to another without need for handling the motor frame to be dried.

Still another specific object of my present invention is to provide a new and improved electrically operable portable baking oven for motor frames or the like which may be quickly and easily adjusted to automatically shut off after a predetermined heating interval, and in which the heated air is most effectively utilized and circulated.

An additional specific object of the present invention is to provide an improved portable drying unit in which all parts are readily accessible for inspection, replacement or repair without need for special tools and equipment, the improved devices being capable of quantity production at moderate cost.

A further specific object of the present invention is to provide an improved drier for electric motor frames comprising, an electrical control box, a supporting frame for the control box, an electric heater element projecting laterally from the control box and adapted to extend into the stator of the motor frame, and a pair of opposed conical reflectors adapted for disposition and retention at opposite ends of the motor frame to substantially enclose the motor stator.

These and other specific objects and advantages of the invention will become apparent from the following detailed description.

A clear conception of the several features constituting the present improvement and of the mode of constructing and of utilizing a typical motor drier embodying the invention may be had by referring to the drawing accompanying and forming a part of this specification, wherein like reference characters constitute the same or similar parts in the several views.

Fig. 1 is a side view of one of my improved drier units applied to a typical motor frame, portions of one of the reflector shields and of the suction hose being broken away to reveal normally hidden structure;

Fig. 2 is a partial transverse section through the device taken along the irregular line 2—2 of Fig. 1, but showing the control box or casing in a different position of adjustment;

Fig. 3 is a plan view of one of the improved reflector shields in normally flat condition;

Fig. 4 is a similar view of the reflector shield of Fig. 3, but showing the same distorted to conical shape with three equally spaced spacer springs applied thereto; and Fig. 5 is a schematic diagram depicting several positions of adjustment to which the reflector may be distorted.

While the invention has been shown and described herein as being specifically embodied in a portable drying unit for electric motor frames, it is not desired or intended to unnecessarily restrict or limit the scope or utility of the improvement by virtue of such specific embodiment since the improved devices may obviously be advantageously utilized for drying diverse other articles; and it is also contemplated that certain specific descriptive terms used herein shall be given the broadest possible interpretation consistent with the disclosure.

Referring to the drawing, the drier is shown in Fig. 1 as applied to a typical motor frame 8 having a freshly impregnated stator 9; and the improved device comprises, in general, an electrical control box or housing 10 supported in upright position on a frame 11 having a floor engaging base 12, a blower 13 having its impeller 14 driven by a suitable electric motor 15 and provided at its outlet end with an exhaust or discharge chamber 16 secured to a side of the control box 10 in any convenient manner, an elongated electric heater element 17 projecting laterally and horizontally from the control box 10 through the exhaust chamber 16 and adapted for insertion within the opening of the motor stator 9, a pair of opposed frustro-conical reflectors 18, 19 adapted for disposition and retention at opposite ends of the motor frame 8 so as to substantially enclose the motor stator 9, the reflector 18 being positionable with its reduced end in proximity to the control box 10 and the exhaust chamber 16 and surrounding the heater element 17 so as to thereby form a substantially enclosed heating chamber for the stator 9, and means such as a flexible hose 20 suitably secured to the reduced end of the reflector 19 at one end and to the suction inlet 21 of the blower 13 at its other end to thereby form a substantially closed circuit for air circulated by the blower.

The blower motor 15 and the heater rod 17 may be suitably connected in a well known manner by means of wires 22, 23 to a source of electrical energy with the respective circuits being controlled by switches 24, 25, and these switches may be wired to suitable commercially available timing and heat control devices 26, 27 respectively for automatic control and shut-off. The control box 10 may be conveniently formed of sheet metal with the aid of punches and dies with a carrying handle 28 secured to the upper end thereof if desired; and the supporting frame 11 may be readily formed of bar stock bent to inverted U-shape with the vertical spaced legs 29 thereof disposed on opposite sides of the control box 10 and having the lower portions bent perpendicular to the respective uprights to form the floor engaging base portions 12. To readily adapt the improved unit to motor frames of varying sizes, the control box 10 is rendered readily adjustable along the vertical frame uprights 29 by means of attachment or clamping members 30 secured to the sides of the box 10 by means of machine screws, bolts or wing nuts which may be quickly and easily loosened and subsequently tightened in an obvious manner to effect the desired vertical adjustments. The blower housing 13 and the exhaust or outlet chamber 16 may likewise be formed of sheet metal and may be suitably secured to the side of the control box 10 by means of machine screws or the like; and to provide passage for air under pressure from the chamber 16 axially through the reflector 18 and the motor stator 9, the exhaust chamber 16 is provided with a plurality of discharge orifices or perforations 31 surrounding the heater element 17. The conical reflectors 18, 19 may also be formed of suitable relatively thin light reflecting sheet metal, and these reflectors may either be pre-formed to a given conical size and shape or one or both of them may be of the adjustable type shown in Figs. 4 to 5 wherein the reflector 18 is formed from a normally flat relatively flexible sheet 32 cut to ring-shape with a sector 33 removed therefrom to permit distortion of the sheet to any desired conical shape as schematically illustrated in Fig. 5, the sheet being retained in the desired distorted conical shape by means of suitable clips 34 coacting with inner and outer edges of the overlapped portions of the sheet 33 and resiliently retained in position by a compression spring 35. In addition to their function in retaining the clips 34 in clamping position, the spring 35 serves the further utilitarian purpose of coacting with either the end of the motor frame 8 or with the end of the stator 9 to slightly space the reflector therefrom and maintain the same out of direct contact with the freshly coated surface; and whether the reflectors 18, 19 are of the pre-formed or adjustable type, it is desirable to utilize a spaced series of these springs 35, as shown, for spacing purposes. In applying the reflectors 18, 19 to the motor frame 8, it is only necessary to place the same over the opposite ends of the stator 9 and apply a series of retainer springs 36 at spaced points about the periphery of the reflectors 18, 19 as shown in Fig. 1, the springs being attachable in any suitable manner to the reflectors so as to constantly resiliently urge the same toward each other and toward the stator ends. With the improved drier then positioned as shown in Fig. 1 with the heater rod 17 extending through the reflector 18 and the motor stator 9, a substantially closed air circuit is formed for the blower 13 by way of the exhaust chamber 16, orifices 31, reflector 18, stator 9, reflector 19, conduit 20 and blower inlet 21; and to permit variable controlled amounts of fresh air to the circuit, the blower inlet flange 21 may be provided with an elongated air opening 37 which may be opened or closed to varied extents by simple adjustment of the tubing 20 along the inlet flange 21 of the blower.

In actual use, the improved device may be readily carried to any desired locality in a convenient manner by means of the handle 28. The control box may then be quickly and easily adjusted to the desired height for the motor frame 8 to be dried by means of the clamping elements 30. Likewise, the reflectors 18, 19 may be readily applied to the opposite ends of the motor frame and retained in position by means of the springs 36, the reflectors being maintained a slight distance from the wet stator and/or motor frame by means of the spacer springs 35. With the adjustment thus affected and the box 10 positioned so that the laterally projecting heater element 17 extends through the motor stator and the reduced end of the reflector 18 is substantially seated against the exhaust chamber 16 about the air discharge openings 31, the unit may be connected to a source of electrical energy. The controls 26, 27 may then be set to the desired time interval and required heat, and the switches 24, 25 may then be turned on to cause the heater element to bake the stator coating thoroughly throughout the entire area while the blower continuously circulates the heated air, after which the unit will shut off automatically and may be conveniently moved to another motor frame.

From the foregoing detailed description, it is believed apparent that the present invention contemplates the provision of an improved portable drying unit especially adapted for baking the coated surfaces of motor frames or the like which is highly efficient in actual operation and which is extremely durable and compact in construction. The various parts of the improved device may be readily fabricated of available materials such as sheet and bar stock, and the improved units may be readily assembled at low cost. In addition to the relatively low initial cost of the improved devices, it is obvious that the heat supplied through the rod 17 is most effectively distributed and radiated in a confined space over the entire area of the article to be dried, and therefore there is a minimum loss of heat coupled with a relatively short drying interval for each unit which accordingly reduces the operational expense to a minimum. By reason of the present construction, the blower 13 is also effectively utilized with maximum efficiency since the air circulated by this blower is reused in heated condition, and by a simple adjustment, varying amounts of fresh air may be supplied to the air circuit. The improved drying units have, in fact, gone into actual commercial use with excellent results, and these units may be used in the field as well as in manufacturing plants.

It should be understood that it is not desired or intended to limit this invention to the exact details of construction or to the precise mode of use herein shown and described, since various modifications may occur to persons skilled in the art to which this invention pertains.

I claim:

1. A drier for electric motor frames, comprising, an electrical control box, a frame having a pair of uprights cooperable with opposite sides of said control box for supporting the same in elevated condition, an electric heater element projecting laterally from said control box and adapted to extend into the stator of the motor frame, and a pair of opposed conical reflectors adapted for disposition and retention against opposite ends of the motor frame to substantially enclose the motor stator, one of said reflectors being positionable about said heater element in proximity to said control box.

2. A drier for electric motor frames, comprising, an electrical control box, a supporting frame for vertically supporting said control box, means for effecting adjustments of said control box to different heights on said supporting frame, an electric heater element projecting laterally from said control box and adapted to extend into the stator of the motor frame, and a pair of opposed conical reflectors adapted for disposition and retention against opposite ends of the motor frame to substantially enclose the motor stator, one of said reflectors being positionable about said heater element in proximity to said control box.

3. A drier for electric motor frames, comprising, an electrical control box, an inverted U-shaped supporting frame for said control box, the vertical legs of said supporting frame being disposed on opposite sides of said control box and being formed with floor engaging base portions at the lower ends thereof, means carried by said control box for adjusting the same to different positions along the supporting frame legs, an electric heater element projecting horizontally from said control box and adapted to extend into the stator of the motor frame, and a pair of opposed conical reflectors adapted for disposition and retention against opposite ends of the motor frame to substantially enclose the motor stator, one of said reflectors being positionable about said heater element in proximity to said control box.

4. A drier for electric motor frames, comprising, an electrical control box, a frame having legs cooperable with said control box for supporting the same in elevated condition, an electric heater element projecting laterally from said control box and adapted to extend into the stator of the motor frame, a pair of opposed conical reflectors adapted for disposition and retention against opposite ends of the motor frame to substantially enclose the motor stator, one of said reflectors being positionable about said heater element in proximity to said control box, and means for constantly resiliently urging said reflectors toward each other.

5. A drier for electric motor frames, comprising, an upright electrical control box, a supporting frame having a floor engaging base and spaced uprights for adjustably receiving and supporting said control box, an electric heater element projecting laterally from said control box and adapted to extend into the stator of the motor frame, and a pair of opposed frustro-conical reflectors adapted for disposition and retention at opposite ends of and in axial alignment with the motor frame to substantially enclose the motor stator, one of said reflectors being positionable in proximity to said control box with said heater element extending therethrough.

6. A drier for electric motor frames, comprising, an electrical control box, a supporting frame adjustably associated with said control box, means for effecting adjustments of said control box to different heights on said supporting frame, an elongated electric heater element projecting laterally from said control box and adapted to extend into the stator of the motor frame, a pair of opposed frustro-conical reflectors adapted for disposition and retention at opposite ends of the motor frame to substantially enclose the motor stator, one of said reflectors being positionable in proximity to said control box with said heater element extending therethrough, and means carried by each of said reflectors and adapted to coact with the motor frame at spaced points to retain the reflectors out of direct contact with the motor frame.

7. A drier for electric motor frames, comprising, an electrical control box, a supporting frame for said control box, an electric heater element projecting laterally from said control box and adapted to extend into the stator of the motor frame, a pair of opposed frustro-conical reflectors adapted for disposition and retention at opposite ends of the motor frame to substantially enclose the motor stator, at least one of said reflectors being distortable to different conical shapes and positionable in proximity to said control box with said heater element extending therethrough, and means for retaining said distortable reflector in its different shapes.

8. A drier for electric motor frames, comprising, an electrical control box, a frame having a pair of spaced uprights secured to opposite sides of said control box for supporting the same in elevated condition, an electric heater element projecting laterally from said control box and adapted to extend into the stator of the motor frame, a pair of opposed frustro-conical reflectors adapted for disposition and retention at opposite ends of the motor frame to substantially enclose the motor stator, one of said reflectors being positionable in proximity to said control box with said heater element extending therethrough, and means for circulating air through the motor stator about said heater element.

9. A drier for electric motor frames, comprising, an electrical control box, a frame for supporting said control box, a blower mounted directly on said control box and having an exhaust chamber located on a side wall of said control box, an electric heater element projecting laterally from said control box through said side wall and said exhaust chamber and adapted to extend into the stator of the motor frame, said exhaust chamber having a discharge opening adjacent to said heater element, a pair of opposed frustro-conical reflectors adapted for disposition and retention at opposite ends of the motor frame to substantially enclose the motor stator, one of said reflectors being positionable in proximity to said control box with said heater element extending therethrough, and means associated with the other reflector and communicating with the blower inlet for forming a continuous air circuit.

10. A drier for electric motor frames, comprising, an electrical control box, a supporting frame for said control box, a blower mounted with an exhaust chamber on one side of said control box, an electric heater element projecting laterally from said control box through said exhaust chamber and adapted to extend into the stator of the motor frame, said exhaust chamber having a plurality of discharge orifices surrounding said heater element, a pair of opposed frustro-conical reflectors adapted for disposition and retention at opposite ends of the motor frame to substantially enclose the motor stator, one of said reflectors being positionable in proximity to said control box so as to surround said heater element and the discharge orifices in said exhaust chamber, and a flexible tube extending from the other of said reflectors to the inlet of said blower for completing a continuous air circuit.

11. A drier for electric motor frames, comprising, an electrical control box, a supporting frame for said control box, a blower mounted with an exhaust chamber on one side of said control box, an electric heater element projecting laterally from said control box through said exhaust chamber and adapted to extend into the stator of the motor frame, said exhaust chamber having a plurality of discharge orifices surrounding said heater element, a pair of opposed frustro-conical reflectors adapted for disposition and retention at opposite ends of the motor frame to substantially enclose the motor stator, one of said reflectors being positionable in proximity to said control box so as to surround said heater element and the discharge orifices in said exhaust chamber, and means for admitting variable amounts of fresh air to said air circuit adjacent to the blower inlet.

References Cited in the file of this patent

UNITED STATES PATENTS

| | | |
|---|---|---|
| 2,288,618 | Fryer et al. | July 7, 1942 |

FOREIGN PATENTS

| | | |
|---|---|---|
| 226,925 | Switzerland | Jan. 17, 1944 |
| 435,066 | Italy | May 7, 1948 |